(12) United States Patent
Vorndran et al.

(10) Patent No.: US 6,554,737 B1
(45) Date of Patent: Apr. 29, 2003

(54) ENGINE SPEED CONTROL VIA THE TORQUE CONVERTER LOCKUP CLUTCH OF A CONTINUOUSLY VARIABLE DRIVE

(75) Inventors: Ralf Vorndran, Eriskirch (DE); Wolfgang Danz, Friedrichshafen (DE); Andreas Piepenbrink, Meersburg (DE); Andreas Schwenger, Friedrichshafen (DE)

(73) Assignee: ZF Batavia L.L.C., Batavia, OH (US)

( * ) Notice: Subject to any disclaimer, the term of this patent is extended or adjusted under 35 U.S.C. 154(b) by 0 days.

(21) Appl. No.: 09/787,870
(22) PCT Filed: Sep. 22, 1999
(86) PCT No.: PCT/EP99/07041
§ 371 (c)(1),
(2), (4) Date: Mar. 22, 2001
(87) PCT Pub. No.: WO00/19132
PCT Pub. Date: Apr. 6, 2000

(30) Foreign Application Priority Data

Sep. 28, 1998 (DE) .......................... 198 44 440

(51) Int. Cl.⁷ ............................................. B60K 41/12
(52) U.S. Cl. .......................... 477/39; 477/64; 477/176
(58) Field of Search .................. 477/39, 62, 64, 477/168, 169, 176, 180

(56) References Cited

U.S. PATENT DOCUMENTS

| | | | |
|---|---|---|---|
| 5,160,003 A | 11/1992 | Suzuki | 192/3.31 |
| 5,275,267 A * | 1/1994 | Slicker | 477/176 |
| 5,893,438 A | 4/1999 | Hasegawa et al. | 192/3.3 |
| 6,066,069 A * | 5/2000 | Vorndran | 477/39 |
| 6,099,428 A * | 8/2000 | Kashiwase | 475/68 |

FOREIGN PATENT DOCUMENTS

| | | |
|---|---|---|
| DE | 44 09 122 A1 | 2/1995 |
| DE | 196 09 878 A1 | 9/1996 |
| DE | 196 31 071 A1 | 2/1998 |
| DE | 196 45 984 C1 | 5/1998 |
| EP | 0 833 085 A2 | 4/1998 |

* cited by examiner

Primary Examiner—Douglas C. Butler
Assistant Examiner—Thomas J. Williams
(74) Attorney, Agent, or Firm—Davis & Bujold, P.L.L.C.

(57) ABSTRACT

Within the scope of the method for controlling the engine rotational speed via the torque converter lock-up clutch during the starting and stopping phases of a motor vehicle having a continuously variable transmission combined with other elements of the drive train, the closing and opening of the torque converter lock-up clutch are used as implicit function so as to ensure optimum comfort via the most asymptotic adjustment possible of the rotational speeds gradients of engine and turbine during starting and by a soft, defined separation of the speed characteristic curves of the engine and turbine during stopping. When the vehicle is standing still the forward clutch is moved into standstill disengaged mode so that the torque converter lock-up clutch can be fully closed.

20 Claims, 1 Drawing Sheet

Figure 1:
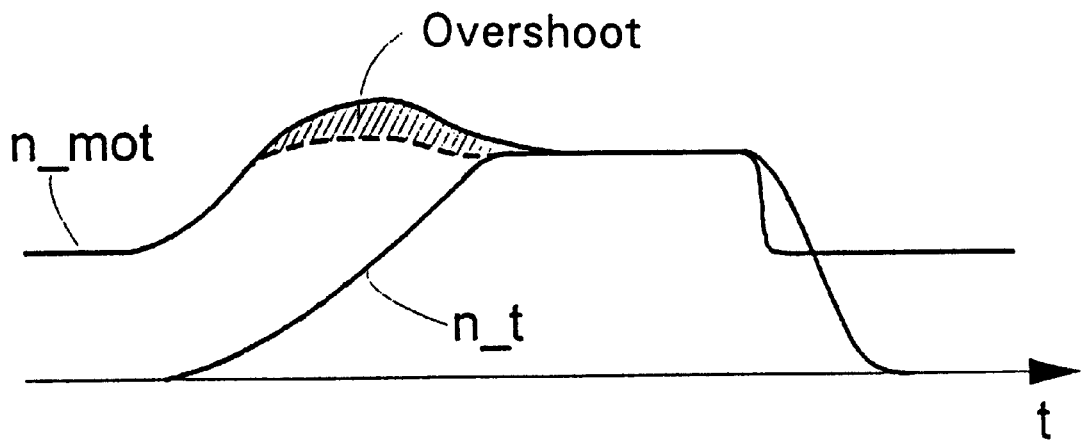

ENGINE SPEED CONTROL VIA THE TORQUE CONVERTER LOCKUP CLUTCH OF A CONTINUOUSLY VARIABLE DRIVE

FIELD OF THE INVENTION

This invention relates to a method for engine speed control via the torque converter lockup clutch combined with other elements of the drive train of a continuously variable transmission.

BACKGROUND OF THE INVENTION

Hydrodynamic torque converters in automatic transmission perform the task of ensuring a comfortable starting operation with sufficient starting power. Besides, by means of the hydrodynamic torque converter the torsional vibrations of the engine are uncoupled form the drive train. The efficiency losses resulting form the use of a hydrodynamic torque converter are reduced by the torque converter lockup clutch.

In the conventional method for control of the torque converter lockup clutch in stepped and continuously variable automatic transmissions, the torque converter is closed when starting via characteristic lines dependent on rotational speed. Subject to the differences of torque between input and output side, the torque converter is here "wound up" at the beginning of the starting operation, which generally results in the generation of a significant rotational speed difference between engine rotational speed and turbine rotational speed. Said difference in rotational speed depends on the torque converter characteristic (soft/hard) and can be distinctly above 1000 revolutions per minute.

In the customary closing of the torque converter lockup clutch controlled by characteristic lines there generates, specially in the lower load range and subject to the generally lower nominal operating point, a clearly negative rotational speed gradient of the engine. The closing of a torque converter lockup clutch is then felt by the driver as an extremely disturbing overshoot, which also adds negatively to the experience.

Furthermore, in a conventional transmission controlled by characteristic lines there generates in the coasting operation, when opening the torque converter lockup clutch, the usual "dipping" of the engine rotational speed below the turbine rotational speed, a fact that the driver generally will find disturbing.

The Applicant's DE 196 31 071 A1 discloses a control system for a continuously adjustable transmission. The engagement or disengagement of the torque converter lockup clutch (WK) is here implemented as function of the control of the nominal rotational speed of the engine. This method makes it possible to reduce the overshoot of the engine rotational speed when starting.

However, the overshoot of the engine rotational speed cannot be entirely dominated thereby: at the start of the regulating phase a distinct increase of the engine rotational speed is to be detected. The cause of said effect is the reaction times of the torque converter to an outer control which amount to a few hundred milliseconds (msec), since the oil rearrangement operation (reversal WK at operation to WK to operation) have to be carried out first.

Only after the oil rearrangement operations have been finished in the torque converter can the torque converter lockup clutch build up the torque needed for control of the engine rotational speed along the trajectory. In an assumed time constant of 40 msec for build up and breakdown of pressure, about 200 msec lapse in this example until the torque converter lockup clutch receives the desired direct connection. The normal average reaction times still are clearly above that. During this time there is no influence on the behavior of the torque converter lockup clutch so that also no control of the engine rotational speed is possible according to this application.

In conventional transmissions of the prior art different circumstances can cause the torque converter lockup clutch not to be fully open whereby a down of the engine is caused when stopping.

Therefore, this invention is based on the problem of providing, departing from the cited prior art, a method for control of the engine speed via the torque converter lockup clutch, which method ensures during the starting phase an immediate reaction of the torque converter lockup clutch and thus optimum comfort with enough starting power, and in the stopping phase prevents "stalling" of the engine resulting from a malfunction of the torque converter lockup clutch and the lowering of the engine rotational speed below the turbine rotational speed in coasting operation.

In particular the above mentioned overshoot of the engine rotational speed when starting must be reduced as far as possible.

In addition the inventive method must be of reasonable cost and easy to implement.

SUMMARY OF THE INVENTION

It is accordingly proposed to use the closing and opening of the torque converter lockup clutch as an implicit function so as to ensure an optimum comfort by the most asymptotic adjustment possible of the rotational speed gradients of engine and turbine when starting and by a soft, defined separation of the rotational speed curves of engine and turbine when stopping, and thereby to minimize the reaction times of the torque converter by moving the forward clutch while the vehicle stands still to the standstill disengaged mode so that the torque converter lockup clutch can be fully closed.

When starting the engine rotational speed is here approximated by the torque converter lock-up clutch to a defined trajectory, the engine rotational speed being equal to the turbine rotational speed at the end of the trajectory. Consequently, an overshoot of the engine rotational speed when starting is reduced and a jolt-free comfortable closing of the torque converter lock-up clutch is ensured.

According to this invention it is provided that the overshoot of the engine rotational speed at the beginning of the regulating phase when starting be additionally reduced by minimizing the reaction times of the torque converter to an outer control, which can amount to several hundred msec.

Only after the oil rearrangement operations have been finished in the torque converter can the torque converter lock-up clutch build up the torque needed for control of the engine rotational speed along the trajectory. For the earliest adaptation of the engine speed during the starting mode, it will be necessary for the converter lock-up clutch to initiate a direct connection to the system immediately at the beginning of the control phase. The invention suggests to conclude the time-consuming oil transferring processes in the torque converter as early as possible and to keep the torque converter lock-up clutch in active stand-by mode.

This is achieved within the scope of this invention by the fact that the torque converter lock-up clutch is operated when the vehicle stands still in interplay with the forward clutch.

At the same time, the forward clutch must be operated in "standstill disengaged mode" (SBC standby control) which, in this range, makes it possible to fully close the torque converter lockup clutch.

In the SBC operation known from the prior art, while the vehicle is stopped, the forward clutch (in position "R" applies also to the corresponding shifting element) is opened precisely to the extent that the input torque needed for moving off is in the load-free state precisely somewhat below the outcropping, load torque. As a result is prevented in operation in position "D" without actuating the vehicle brake the moving off typical for automatic transmission. By this step in addition to the efficiency losses are reduced due to movement of the operating point of the torque converter. Therefore, the SBC function also brings with it a reduction in consumption.

The power loss and therewith the heat load produced on the torque converter lock-up clutch are hereby outside the critical range.

This procedure eliminates the shifting characteristic lines and the threshold value questions for closing and opening the torque converter lockup clutch.

The defined control of the engine used within the scope of this invention has an advantage in that the compromise between starting power and rotational speed overshoot essential for a positive driving feeling can be implemented in an optimal way.

Besides, the inventive method results in a reduction of fuel consumption.

To ensure when stopping a reliable opening of the torque converter lock-up clutch, there are not admitted, according to the invention, engine rotational speed values below a defined threshold value over the idling speed. It is additionally provided within the scope of this invention to introduce an early opening of the torque converter clutch by means of a boosting of the nominal rotational speed of the engine or increase of the nominal ratio value.

It is further proposed entirely to prevent, by a defined engine rotational speed standard and control of the torque converter lock-up clutch, the "dipping" of the engine rotational speed below the turbine rotational speed usual in coasting operations, which the driver generally senses as disturbing. To that end the engine nominal rotational speed is kept as long as possible at the turbine nominal rotational speed. If as a result of disturbing marginal effects (such as resonance humming on account of the almost closed torque converter lock-up clutch in the lower rotational speed range) it is not possible to keep the engine rotational speed value above the turbine rotational speed only by control of the torque converter lock-up clutch, it is also possible here to supportively raise the ratio value.

According to the invention, when the torque converter lock-up clutch cannot be fully opened, the engine stalls when stopping by the fact that the drive train is interrupted upon detection of this malfunction of the torque converter lock-up clutch.

In this case the engine rotational speed trajectory, which is normally used to control the torque converter lock-up clutch, serves as standard value for the slip regulation of the forward clutch.

BRIEF DESCRIPTION OF THE DRAWING(S)

Figure 2:
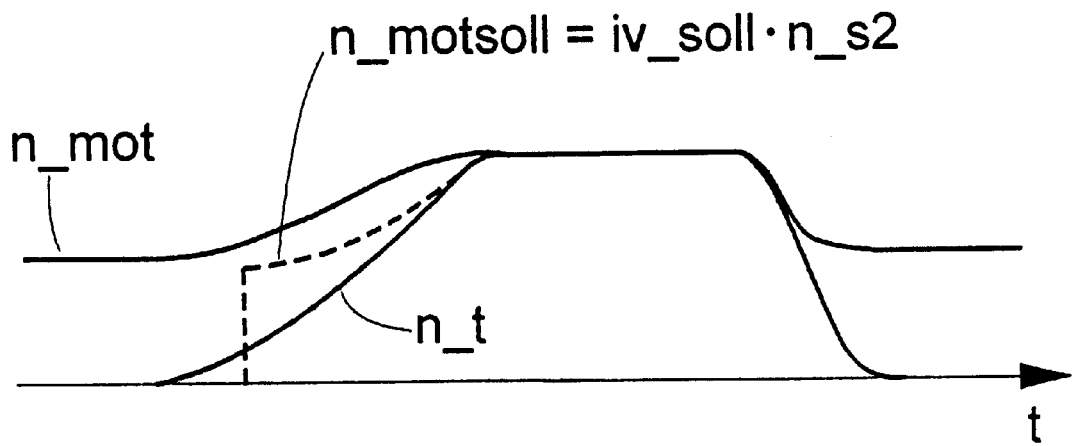

The invention is explained in detail herebelow with reference to the drawings which show:

FIG. 1 a fundamental illustration of a starting and stopping operation according to a conventional method; and FIG. 2 a fundamental illustration of a starting and stopping operation by the method according to this invention.

DETAILED DESCRIPTION OF THE INVENTION

FIG. 1 show a closing operation of the torque converter lock-up clutch according to the prior art. The line n__mot shows the engine rotational speed and the line n__t shows the rotational speed curve of the turbine. The overshoot of the engine rotational speed, when starting, is clearly detected. This range is shown as hatching. The rotational speeds of the engine and of the turbine are adjusted only after the torque converter clutch is fully closed.

This overshoot of the engine rotational speed, during the starting phase, is extremely disturbing to the driver.

In FIG. 1, the usual dipping effect of the prior art of the engine rotational speed below the turbine rotational speed in the coasting operation when opening the torque converter lock-up clutch is also illustrated. The driver also senses this effect as generally disturbing.

FIG. 2 illustrates the starting and stopping operations according to this invention.

The dotted line is the trajectory n__mot__soll of the nominal rotational speed of the engine.

The nominal value for the trajectory of the engine rotational speed is deduced from an actual operating point standard for the ratio according to the equation $$n\_mot\_soll = iv\_soll \cdot n\_s2$$

wherein n__mot__soll is the nominal rotational speed of the engine, iv__soll the nominal ratio, and n__s2 the rotational speed of a secondary disc.

An abrupt increase in the engine rotational speed, at the beginning of the regulating phase, is prevented by minimizing the reaction time of the torque converter by the inventive preconditioning in standstill.

The preconditioning consists in that time-consuming oil rearrangement operations, in the torque converter, are terminated as early as possible whereby the torque converter lock-up clutch is maintained ready for action.

This occurs by moving the forward clutch to a SBC operation. Thereby a full closing of the torque converter lock-up clutch is possible.

Within the scope of the inventive method, the torque converter lock-up clutch, closed after passage of the forward clutch to the SBC operation, is driven from the control pressure level to near its slip limit in order to be opened as quickly as possible in case of a sudden starting operation for which the forward clutch must be engaged. The influence upon the engine rotational speed is accordingly effective and the interfering overshoot can be almost entirely compensated.

The engagement of the forward clutch and the passage of the torque converter lock-up clutch to the engine rotational speed control complementarily develop by means of an overlapping gear shift.

At the same time, a superimposed driving strategy ensures that the engine rotational speed, at the closing of the torque converter lock-up clutch, is inverted to the turbine rotational speed.

From FIG. 2 it becomes clear that the engine rotational speed level is distinctly below that of the closing operation controlled by shift characteristic lines of the torque converter lock-up clutch. The effect of the increase of the engine rotational speed can be almost fully prevented. Likewise clear is the soft adjustment of the rotational speeds of engine and turbine during closing of the torque converter lock-up clutch according to the invention.

As reliable as possible an opening of the torque converter lock-up clutch when stopping is ensured by the fact that the engine rotational speed nominal values below a defined threshold value over the idling speed are not admitted. For assistance the driving strategy can in addition correctingly interfere by boosting the nominal rotational speed of the engine above the ratio standard in order to introduce an early opening of the torque converter lock-up clutch.

The "dipping" of the engine rotational speed below the turbine. rotational speed, usually during a coasting operation when opening the torque converter lock-up clutch, is entirely prevented—as clearly illustrated in FIG. 2—by the defined engine rotational speed standard and control of the torque converter lock-up clutch. According to the invention, the engine nominal rotational speed is kept at the turbine rotational speed value as long as possible.

In case of a malfunction when opening the torque converter lock-up clutch, the necessary interruption of the drive train occurs via the forward clutch, the engine rotational speed trajectory serving as standard value of the slip regulation of the forward clutch.

As soon as the vehicle reaches a standstill, the engine rotational speed control function of the forward clutch passes to the SBC operation. If said operating state has been definitely reached, the torque converter lock-up clutch is passed to the above described closed operation on the slip limit. Consequently, during standstill the same operating state of forward clutch and torque converter lock-up clutch always exists; this occurs independently of whether the stopping has been carried out with torque converter lock-up clutch opening, without any problem, or only using the proposed function via the forward clutch.

In the case of the torque converter lock-up clutch suddenly pulling apart during the substitute function via the forward clutch, the forward clutch converts to a "closed" state. Here whether the torque converter lock-up clutch remains open is continuously monitored. If standstill of the vehicle is again detected, then the passage of the forward clutch to the standstill disengaged mode occurs in open state of the torque converter lock-up clutch and thereafter the torque converter lock-up clutch is again passed to the closed operation on the slip limit.

If prior to reaching a standstill of the vehicle, the driver again steps on the gas (starting through), the forward clutch is first closed and thereafter the torque converter lock-up clutch is closed, the torque converter lock-up clutch is again passed to the preset rotational speed trajectory of the engine, as described already.

A specially advantageous variant of this invention provides that in order to prevent a thermal overload of the torque converter lock-up clutch (the same as of the whole torque converter) the actual power loss be continuously calculated during the entire "slip operation" and compared with a preset admissible limiting value. When exceeding said limiting value, the torque converter lock-up clutch is opened in order to effect a cooling by the now increased flow through the torque converter. If the difference between engine and turbine rotational speeds has already decreased to a very small value (such as 50–100 rpm), when exceeding the limiting value, the torque converter lock-up clutch can be entirely closed so as to forestall further heat feeding.

Only after lapse of a locking time adapted to the cooling process is the torque converter lock-up clutch again released for the slip operation and thus for control of the engine rotational speed.

According to the invention, the thermal load limits are monitored by a physico-mathematical patter.

When circumstances demand it, the inventive functions of the forward clutch are taken over by the reverse clutch.

What is claimed is:

1. A method for engine rotational speed control via a torque converter lock-up clutch during the starting and stopping phases of a motor vehicle having a continuously variable transmission combined with other elements of the drive train, the method comprising the steps of:

using the closing and opening of the torque converter lock-up clutch as an implicit function defined by a most asymptotic adjustment as possible of the rotational speed gradients of the engine and a turbine when starting and by soft, defined separation between an engine rotational speed curve and a turbine rotational speed curve when stopping, and wherein an optimum comfort is ensured in that when the vehicle stands still a forward clutch is moved to a standstill disengaged mode so that the torque converter lock-up clutch can be fully closed.

2. The method according to claim 1, wherein at starting the engine rotational speed is approximated by the torque converter lock-up clutch to a defined trajectory, the engine rotational speed at the end of the trajectory being the same as the turbine rotational speed.

3. The method according to claim 2, wherein the trajectory is defined according to $$n\_mot\_soll = iv\_soll \cdot n\_s2$$

n_mot_soll being the nominal engine rotational speed, iv_soll the nominal ratio and n_s2 the rotational speed of the secondary disc.

4. The method according to claim 3, wherein a pressure level of the closed torque converter lock-up clutch is driven closely above a pressure value where a slip-free transfer of the outcropping engine torque is ensured so that the reaction times be minimized when passing to the engine rotational speed control operation at starting.

5. The method according to claim 4, wherein the closing of the forward clutch and the passage of the torque converter lock-up clutch to the engine rotational speed control operation run complementarily by using an overlapping gear shift.

6. The method according to claim 1, wherein during coasting operation of the vehicle a lowering of the engine rotational speed below the turbine rotational speed when opening the torque converter lock-up clutch is prevented by an engine rotational speed standard defined by the driving strategy and control of the torque converter lock-up clutch.

7. The method according to claim 6, wherein the engine rotational speed standard is kept at the turbine rotational speed value until shortly before reaching an engine idling speed.

8. The method according to claim 7, wherein starting from an adjustable moment shortly prior to reaching the engine idling speed, the engine rotational speed standard is converted to a defined value above the engine idling speed.

9. The method according to claim 1, wherein the drive train is interrupted upon detection of a malfunction of the torque converter lock-up clutch via the forward clutch, the engine rotational speed trajectory serving as a preset value for slip regulation of the forward clutch.

10. The method according to claim 9, wherein while the vehicle stands still the slip regulation function of the forward clutch passes to the standstill disengaged mode so that in standstill there is always the same operating mode of the forward clutch and torque converter lock-up clutch.

11. The method according to claim 9, wherein in case of sudden opening of the torque converter lock-up clutch, the forward clutch is closed, there being continuously monitored whether the torque converter lock-up clutch remains in open state.

12. The method according to claim 1, wherein during the engine rotational speed control operation of the torque converter lock-up clutch the power loss is continuously calculated and compared with a preset limiting value.

13. The method according to claim 12, wherein when the limiting value is exceeded the torque converter lock-up clutch is opened.

14. The method according to claim 13, wherein after lapse of a present locking time which takes into account a cooling operation, the torque converter lock-up clutch is again moved to the engine rotational speed control operation.

15. The method according to claim 12, wherein when the difference between engine rotational speed and turbine rotational speed is reduced to a value smaller than the preset limiting value, the torque converter lock-up clutch is fully closed.

16. A method for controlling engine rotational speed via a torque converter lock-up clutch during the starting and stopping phases of a motor vehicle having a continuously variable transmission, the method comprising the steps of:

starting the vehicle by disengaging a forward clutch and fully closing the torque converter lock-up clutch while the vehicle is in a standstill position to ensure an asymptotic adjustment between an engine rotational speed and a turbine rotational speed; and stopping the vehicle by opening the converter lock-up clutch and ensuring that the engine rotational speed does not fall below the turbine speed and substantially equals the turbine rotational speed for as long as possible to provide a moderate defined separation between the engine rotational speed and the turbine rotational speed when stopping.

17. The method according to claim 16, further comprising the steps of during starting of the vehicle operating the torque converter lock-up clutch according to a theoretical engine rotational speed function and adjusting the engine, rotational speed, to the theoretical engine rotational speed function until the engine rotational speed is the same as the turbine rotational speed.

18. The method according to claim 17, further comprising the step of determining the theoretical engine rotational speed function according to $$n\_mot\_soil - iv\_soll \cdot n\_s2$$

n_mot_soll being the nominal engine rotational speed, iv_soll the nominal ratio and n_s2 the rotational speed of the secondary disc.

19. The method according to claim 18, further comprising the step of ensuring a pressure level of the closed torque converter lock-up clutch remains closely above a pressure value for a slip-free transfer of the engine torque so that reaction times can be minimized during the engine rotational speed control operation at starting.

20. A method for engine rotational speed control via a torque converter lock-up clutch during the starting and stopping phases of a motor vehicle having a continuously variable transmission combined with other elements of a drive train, the method, comprising the steps of:

using the closing and opening of the torque converter lock-up clutch as an implicit function defined by a most asymptotic adjustment as possible of the rotational speed gradients of the engine and a turbine when starting and by soft, defined separation of the rotational speed curves of the engine and the turbine when stopping, and an optimum comfort is ensured in that when the vehicle stands still a forward clutch is moved to a standstill disengaged mode so that the torque converter lock-up clutch can be fully closed;

wherein at starting the engine rotational speed is approximated by the torque converter lock-up clutch to a defined trajectory, the engine rotational speed at the end of the trajectory being the same as the turbine rotational speed.

\* \* \* \* \*